United States Patent
Kwon et al.

(10) Patent No.: US 11,855,296 B2
(45) Date of Patent: Dec. 26, 2023

(54) BATTERY CELL HAVING BATTERY CASING WITH RECEIVING PART AND ELECTRODE LEAD GROOVE

(71) Applicant: LG CHEM, LTD., Seoul (KR)

(72) Inventors: Soon-Kwan Kwon, Daejeon (KR); Sang-Baek Ryu, Daejeon (KR); Shin-Hyo Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 497 days.

(21) Appl. No.: 16/076,430

(22) PCT Filed: Sep. 28, 2017

(86) PCT No.: PCT/KR2017/010841
§ 371 (c)(1),
(2) Date: Aug. 8, 2018

(87) PCT Pub. No.: WO2018/062902
PCT Pub. Date: Apr. 5, 2018

(65) Prior Publication Data
US 2019/0044106 A1    Feb. 7, 2019

(30) Foreign Application Priority Data
Sep. 28, 2016 (KR) .......... 10-2016-0124699

(51) Int. Cl.
*H01M 50/124* (2021.01)
*H01M 50/55* (2021.01)
(Continued)

(52) U.S. Cl.
CPC ....... *H01M 50/124* (2021.01); *H01M 50/119* (2021.01); *H01M 50/121* (2021.01);
(Continued)

(58) Field of Classification Search
CPC ............ H01M 2/06; H01M 2/08; H01M 2/26; H01M 2/30; H01M 2/0287; H01M 2/021;
(Continued)

(56) References Cited

U.S. PATENT DOCUMENTS 10,014,556 B2  7/2018  Kwon et al.
2014/0370371 A1  12/2014  Ozawa et al.
(Continued)

FOREIGN PATENT DOCUMENTS

CN  104145350 A  11/2014
CN  104769740 A  7/2015
(Continued)

OTHER PUBLICATIONS

ENglish Translation of KR10-2016-0062898.*
International Search Report (PCT/ISA/210) issued in PCT/KR2017/010841, dated Jan. 11, 2018.

*Primary Examiner* — Stephen J Yanchuk
(74) *Attorney, Agent, or Firm* — Birch, Stewart, Kolasch & Birch, LLP

(57) ABSTRACT

Disclosed in a battery cell including: an electrode assembly including a positive electrode, a negative electrode, and a separator interposed between the positive and negative electrodes, with electrode tabs protruding from at least one side of outside peripheral portions of the electrode assembly; and a battery casing including first and second casings provided with first and second receiving parts, respectively, the first and second receiving parts respectively accommodating the electrode assemblies and having different sizes or shapes, wherein in a state in which electrode leads connected to the electrode tabs protrude from outside peripheral portions of the first and second casings, the battery casing is sealed by thermal fusion along the outside peripheral portions of the first and second casings, wherein electrode lead grooves recessed downwardly such that the electrode leads are seated
(Continued)

therein are provided at a portion of the outside peripheral portions of the first and second casings.

13 Claims, 4 Drawing Sheets

(51) Int. Cl.
  *H01M 50/119* (2021.01)
  *H01M 50/121* (2021.01)
  *H01M 50/178* (2021.01)
  *H01M 50/186* (2021.01)
  *H01M 50/54* (2021.01)

(52) U.S. Cl.
  CPC ....... *H01M 50/178* (2021.01); *H01M 50/186* (2021.01); *H01M 50/55* (2021.01); *H01M 50/54* (2021.01)

(58) Field of Classification Search
  CPC .. H01M 2/266; H01M 2/0275; H01M 50/172; H01M 50/124; H01M 50/531; H01M 50/543; H01M 50/183; H01M 50/116; H01M 50/54; H01M 50/55; H01M 50/178; H01M 50/121; H01M 50/119; H01M 50/186; H01M 10/0431; H01M 50/557; Y02P 70/50; Y02E 60/10
  See application file for complete search history.

(56) References Cited

U.S. PATENT DOCUMENTS

| | | |
|---|---|---|
| 2015/0333375 A1 | 11/2015 | Kwon et al. |
| 2016/0240883 A1 | 8/2016 | Kim et al. |
| 2017/0005318 A1* | 1/2017 | Otohata ................. H01G 11/76 |

FOREIGN PATENT DOCUMENTS

| | | |
|---|---|---|
| EP | 2822055 A1 | 1/2015 |
| EP | 3057169 A1 | 8/2016 |
| JP | WO2015/147066 A1 | 10/2015 |
| KR | 10-2005-0020357 A | 3/2005 |
| KR | 10-2006-0027264 A | 3/2006 |
| KR | 10-2009-0051132 A | 5/2009 |
| KR | 10-2010-0126226 A | 12/2010 |
| KR | 10-2012-0136718 A | 12/2012 |
| KR | 10-2014-0039349 A | 4/2014 |
| KR | 10-2014-0100032 A | 8/2014 |
| KR | 10-2014-0109238 A | 9/2014 |
| KR | 10-2014-0143150 A | 12/2014 |
| KR | 10-2015-0133165 A | 11/2015 |
| KR | 10-2016-0041247 A | 4/2016 |
| KR | 10-2016-0062898 A | 6/2016 |
| KR | 10-2016-0077880 A | 7/2016 |
| WO | WO 2016/056776 A1 | 4/2016 |

* cited by examiner

Conventional Art
[FIG. 1]
100
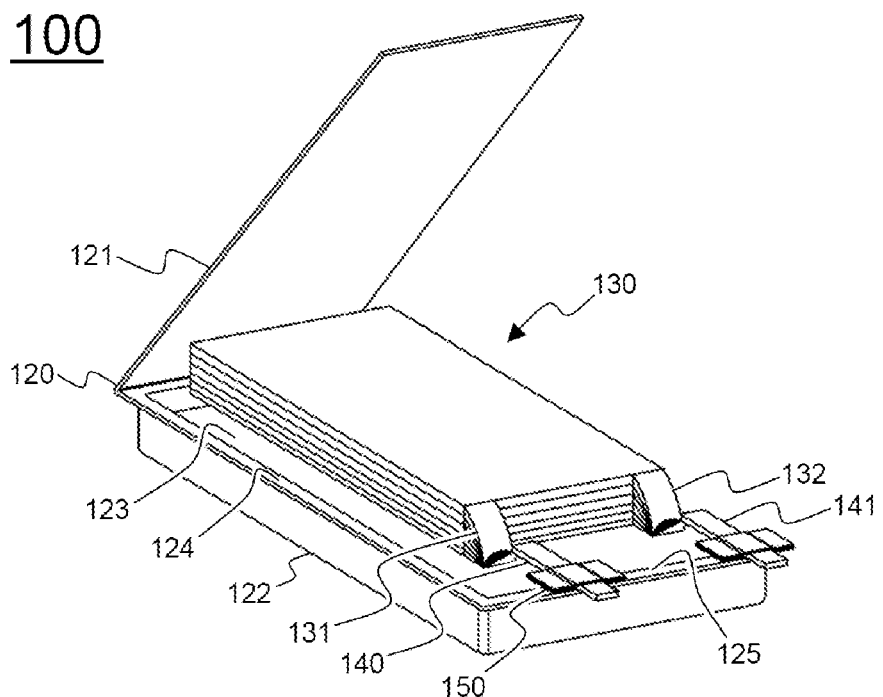

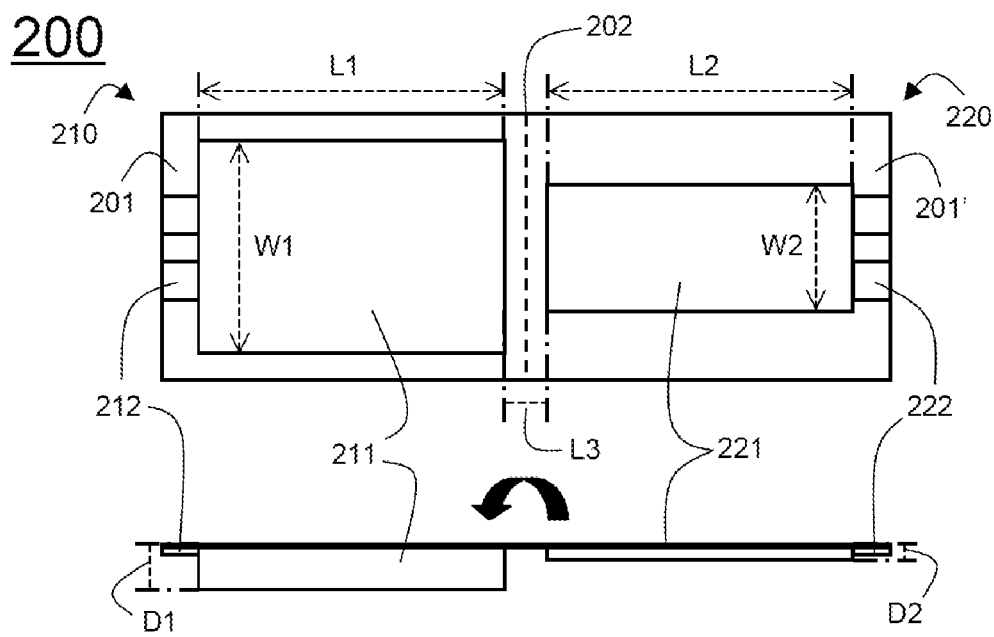
[FIG. 2]

[FIG. 3]
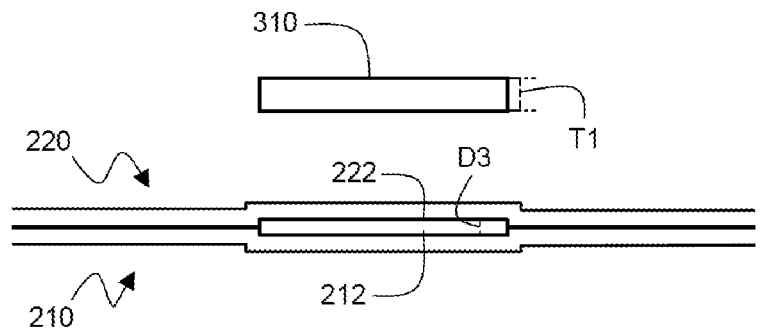
[FIG. 4]
400
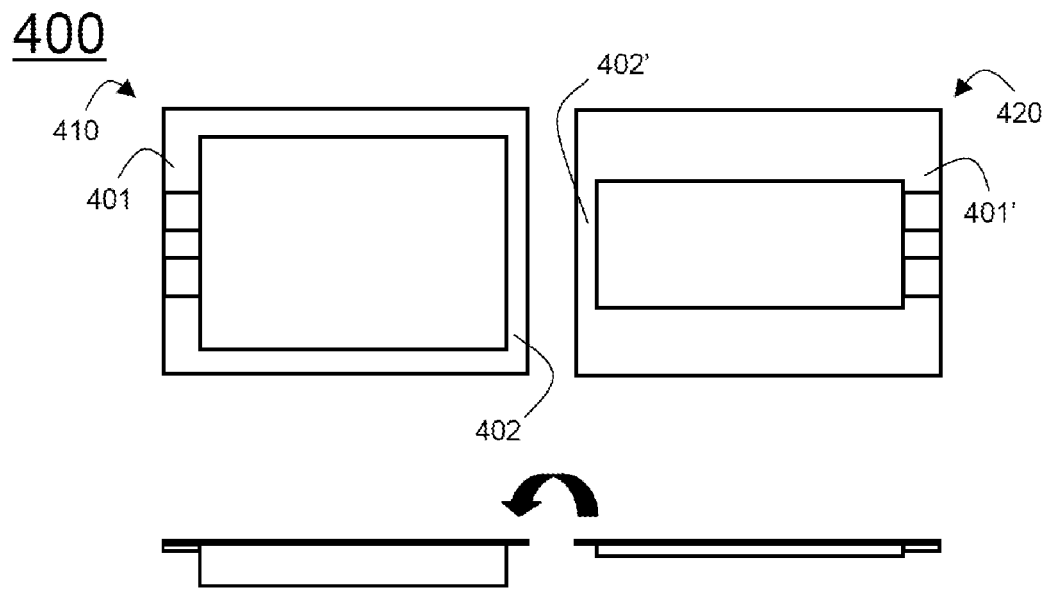

[FIG. 5]
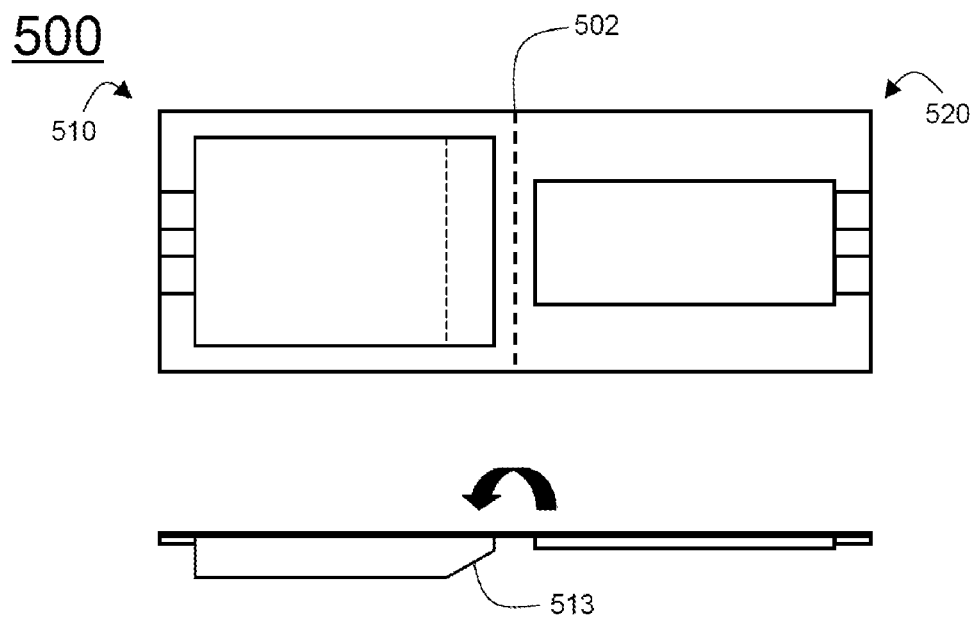

BATTERY CELL HAVING BATTERY CASING WITH RECEIVING PART AND ELECTRODE LEAD GROOVE

BACKGROUND OF THE INVENTION

Field of the Invention

The present invention relates to a battery cell having a battery casing with a receiving part and an electrode lead groove.

Description of the Related Art

In recent years, as the costs of energy sources have increased due to depletion of fossil fuels and interest in environmental pollution has become more intense, the demand for environmentally-friendly alternative energy sources has become an inevitable factor for the future. Thus, studies on techniques for generating electric power, such as nuclear energy, solar energy, wind energy, tidal energy, etc., continue to be conducted, and electric power storage devices for more efficient use of such generated energy are also attracting much attention.

In particular, as techniques associated with mobile devices continue to develop and the demand therefor continues to increase, the demand for batteries as energy sources is rapidly increasing. Accordingly, various studies are being conducted on batteries that can meet various demands.

In terms of the shape of batteries, there is a high demand for prismatic secondary batteries or pouch-shaped secondary batteries, which are thin enough to be applied to products such as mobile phones. In terms of the material for batteries, on the other hand, there is a high demand for lithium secondary batteries such as lithium ion batteries and lithium ion polymer batteries, which exhibit high energy density, discharge voltage, and output stability.

FIG. 1 is an exploded perspective view schematically showing a structure of a conventional pouch-shaped battery cell.

Referring to FIG. 1, a pouch-shaped battery cell 100 includes an electrode assembly 130, electrode tabs 131 and 132 extending from the electrode assembly 130, electrode leads 140 and 141 welded to the electrode tabs 131 and 132, respectively, and a battery casing 120 in which the electrode assembly 130 is mounted.

The electrode assembly 130 is a power generating device including a positive electrode and a negative electrode sequentially stacked with a separator interposed therebetween, and may be configured to have a stack type structure or a stack/folding type structure. The electrode tabs 131 and 132 extend from electrode plates of the electrode assembly 130, respectively. The electrode leads 140 and 141 are electrically connected to the electrode tabs 131 and 132, respectively, which extend from the electrode plates of the electrode assembly 130, for example, by welding. The electrode leads 140 and 141 are partially exposed outward from the battery casing 120. In addition, an insulating film 150 is partially attached to upper and lower surfaces of each of the electrode leads 140 and 141 in order to improve sealing between the electrode leads 140 and 141 and the battery casing 120 while ensuring electrical insulation therebetween.

The battery casing 120 includes a casing body 122 having a concave-shaped receiving part 123 in which the electrode assembly 130 is seated, and a cover 121 integrated with the casing body 122. In a state in which the electrode assembly 130 is accommodated in the receiving part 123, opposite sides 124 and upper end 125 of the casing body 122 and the cover 121 come into contact with each other and then are bonded to each other, whereby a battery is completed. The battery casing 120 is configured to have an aluminum laminate structure including an outer layer of resin, a barrier layer of metal, and a sealant layer of resin exhibiting a thermal bonding property. Thus, the cover 121 and the opposite sides 124 and the upper end 125 of the casing body 122 come into contact with each other and then are bonded to each other when heat and pressure are applied thereto such that the resin layers are thermally fused together, whereby sealed margin portions are formed. Since the same resin layers of upper and lower parts of the battery casing are in direct contact with each other, the opposite sides 124 of the casing body 122 are allowed to be uniformly sealed with the cover 121 by thermal fusion. On the other hand, the electrode leads 140 and 141 positioned at the upper end 125 of the casing body 122 while protruding outward from the battery casing 120. For this reason, in order to enhance sealing of the battery casing 120 in consideration of the thickness of the electrode leads 140 and 141 and the difference in material between the electrode leads 140 and 141 and the battery casing 120, the cover 121 and the upper end 150 of the casing body 122 are thermally fused together in a state in which the insulation films are interposed therebetween.

In order to maximize the capacity of the secondary batteries by making maximum use of a battery cell mounting space in a device having various structures and sizes, studies on battery cells including a plurality of unit cells having different sizes have been actively conducted.

In this regard, the receiving part of the battery casing constituting the pouch-shaped battery cell is generally manufactured by a deep drawing method. Deep drawing is a representative forming process of manufacturing a hollow container without a joint using a planar plate, in which a plate material placed on a surface of a die is compressed by a punch and subjected to plastic working.

The deep drawing method has an advantage of high process efficiency because a final hollow casing may be manufactured from a plate material by a series of successive processes. However, the elongation percentage of a metal plate material differs in each portion depending on the shape of a mold, and thus when the elongation percentage of the metal plate material exceeds the allowable range of elongation percentage, edge cracks may occur. Accordingly, the shape able to be processed by the deep drawing method is limited.

In particular, when forming the receiving part having a complicated structure corresponding to the shapes of the plurality of unit cells, such problems may be exacerbated due to the material characteristics of the pouch-shaped battery casing.

In addition, even when the pouch-shaped battery casing is subjected to thermal fusion while the insulating films are interposed between the electrode leads, portions that remain unfused may be formed at positions where the electrode leads are positioned due to the thickness of the electrode leads.

Consequently, sealing of the battery casing may be degraded at positions of the electrode leads. Moreover, in the case that swelling of the battery cell occurs due to gas generated by reactions between electrodes and electrolyte, pressure of the gas may be concentrated on the unfused portions formed at positions of the electrode leads, leading to damages to the battery casing and degradation in safety.

Thus, there is a high demand for a technique for fundamentally solving these problems.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art.

The present inventors of the present application have carried out intensive research and various experiments. As described later, a battery casing is divided into a first casing and a second casing provided with a first receiving part and a second receiving part, respectively, the first and second receiving parts having different sizes or shapes. Thus, the inventors of the present application have found that it is not necessary to form a single receiving part into a complicated structure to correspond to the shape of an electrode assembly having a complicated structure, so that the battery casing is formed more easily, thereby eliminating or reducing defects that may occur in the forming of the battery casing. In addition, the battery casing is provided with electrode lead grooves having a downwardly recessed structure, whereby at positions of the electrode leads of the battery casing, the occurrence of portions that remain unfused due to the thickness of the electrode leads is suppressed and thus the safety of a battery cell is efficiently enhanced, thereby leading to the present invention.

In order to achieve the above object, according to one aspect of the present invention, there is provided a battery cell, including: an electrode assembly including a positive electrode, a negative electrode, and a separator interposed between the positive electrode and the negative electrode, with electrode tabs protruding from at least one side of outside peripheral portions of the electrode assembly; and a battery casing including a first casing and a second casing provided with a first receiving part and a second receiving part, respectively, the first and second receiving parts respectively accommodating the electrode assemblies and having different sizes or shapes, wherein in a state in which electrode leads connected to the electrode tabs protrude from outside peripheral portions of the first and second casings, the battery casing is sealed by thermal fusion along the outside peripheral portions of the first and second casings, wherein electrode lead grooves are provided at a portion of the outside peripheral portions of the first and second casings where the electrode leads protrude, the electrode lead grooves being recessed downwardly such that the electrode leads are seated therein.

Thus, it is not necessary to form a single receiving part into a complicated structure corresponding to the shape of the electrode assembly having a complicated structure, so that the battery casing can be formed more easily, thereby eliminating or reducing defects that may occur in the forming of the battery casing. In addition, due to provision of the electrode lead grooves, at positions of the electrode leads of the battery casing, the occurrence of portions that remain unfused due to the thickness of the electrode leads can be suppressed and thus the safety of a battery cell can be efficiently enhanced.

In one specific example, the battery casing is not particularly limited in its material or construction as long as it can exert the above described effect. Specifically, the battery casing may be made of a laminate sheet including a metal layer and a resin layer, considering ease of forming of the receiving parts, ease of sealing by thermal fusion, weight reduction of the battery cell, etc.

Further, the battery casing may be configured such that the first and second casings are integrated into a single unit at a predetermined portion of the outside peripheral portions, the first and second casings being configured such that in a state in which the first and second casings are folded at the predetermined portion, remaining portions of the outside peripheral portions are sealed by thermal fusion, such that the first and second receiving parts accommodate the electrode assemblies, respectively.

In other words, the first and second receiving parts, which are different in size or shape from each other, are formed on a planar laminate sheet having a predetermined unit size, whereby the first and second casings integrated with each other at the predetermined portion of the outside peripheral portions are formed to constitute the battery casing.

Thus, a forming process of the laminate sheet, which is required to separately form the first and second casings, can be partially omitted, so that time required for manufacturing the battery casing can be saved. In addition, the first and second casings are integrated into a single unit, so that structural stability of the battery casing can be further improved.

In this case, at the predetermined portion of the outside peripheral portions where the first and second casings are integrated into a single unit, the distance between the first and second receiving parts may be in a range of 1.0 to 2.0 millimeter and more specifically, may be in a range of 1.1 to 1.7 millimeters.

In the case that at the predetermined portion of the outside peripheral portions where the first and second casings are integrated into a single unit, the distance between the first and second receiving parts is excessively narrow outside the ranges, thus in the process of forming the first and second receiving parts by a deep drawing method, the battery casing may be damaged or thinned due to elongation occurring at the predetermined portion of the outside peripheral portions where the first casing and the second casing are integrated with each other due to the material characteristics of the battery casing made of a laminate sheet, which may lead to a degradation in structural stability or safety.

On the other hand, in the case that at the predetermined portion of the outside peripheral portions where the first and second casings are integrated into a single unit, the distance between the first and second receiving parts is excessively wide outside the ranges, thus a sealing portion may be formed in an excessively large size in the process of thermal fusion to the outside peripheral portion of the battery casing and thus an additional process for removing an unnecessary portion of the sealing portion may be required or an overall size of the battery cell may be increased. Accordingly, a space for mounting a device to which the battery cell is applied may be limited.

Meanwhile, the first and second casings may be configured as separate members, and all the outside peripheral portions may be sealed by thermal fusion.

Accordingly, since the first and second casing are provided with the first and second receiving parts, respectively, which are different in size or shape from each other, the first and second receiving parts may be more variously configured and may be selectively and easily adapted according to the size or shape of the electrode assembly.

Further, the first receiving part, or the second receiving part, or both the first receiving part and the second receiving part may include at least one inner peripheral surface having a tapered structure in which width becomes gradually narrower outwards in a vertical cross section.

Thus, even when the electrode assembly accommodated in the first receiving part or the second receiving part further includes an irregular structure such as a step-like structure or an inclined structure, the first and second receiving parts can be adapted more easily without additionally forming receiving parts in response to such structures.

In one specific example, the electrode lead grooves may be formed at the portion of the outside peripheral portions of the first casing, or the second casing, or each of the first and second casings.

As described above, the battery casing may be provided with the electrode lead grooves formed downwardly at the outside peripheral portion of the battery casing where the electrode leads protrude such that the electrode leads are seated in the grooves. More specifically, the battery casing may be configured such that the electrode lead grooves are formed only at one portion of the outside peripheral portions of the first or second casing, or are formed at portions of the outside peripheral portions of the first and second casings, respectively, which correspond to each other.

In this case, the electrode lead grooves may be formed at the portion of the outside peripheral portions of each of the first casing and the second casing, and a total depth obtained by adding a depth of the electrode lead grooves formed at the first casing and a depth of the electrode lead grooves formed at the second casing may be smaller than thickness of the electrode leads.

More specifically, the electrode lead grooves are formed at the portion of the outside peripheral portions of each of the first and second casings, so that the electrode lead grooves can be recessed to have a lower depth than in the case where the electrode lead grooves are formed only at one portion of the outside peripheral portions of the battery casing. Thus, in the process of forming the electrode lead grooves through a deep drawing method, damage or defects that may occur in the outside peripheral portions of the battery casing can be efficiently prevented.

In addition, the total depth obtained by adding the depth of the electrode lead grooves formed at the first casing and the depth of the electrode lead grooves formed at the second casing is relatively small compared to the thickness of the electrode leads, whereby when the battery casing is sealed by thermal fusion, the outside peripheral portions thereof are properly elongated and thus an aesthetic and smooth appearance can be presented.

More specifically, the total depth obtained by adding the depth of the electrode lead grooves formed at the first casing and the depth of the electrode lead grooves formed at the second casing may be 50 to 99% with respect to the thickness of the electrode leads.

In the case that obtained by adding the depth of the electrode lead grooves formed at the first casing and the depth of the electrode lead grooves formed at the second casing is less than 50% with respect to the thickness of the electrode leads, the effect through provision of the electrode lead grooves may not be obtained.

On the other hand, in the case that obtained by adding the depth of the electrode lead grooves formed at the first casing and the depth of the electrode lead grooves formed at the second casing exceeds 99% with respect to the thickness of the electrode leads, in the process of thermal fusion of the outside peripheral portions of the battery casing, the portions where the electrode lead grooves are formed may overlap each other and may be wrinkled, leading to the occurrence of poor appearance. Accordingly, when a sealing portion formed by the thermal fusion is additionally subjected to a process such as bending, the sealing portion may not be easily deformed.

Meanwhile, the depth of the electrode lead grooves formed at the first casing and the depth of the electrode lead grooves formed at the second casing may be equal to each other.

Thus, in the process of thermal fusion of the outside peripheral portions of the battery casing, conditions such as temperature, pressure, etc. applied to the electrode lead grooves formed at each of the first and second casings can be more easily adjusted. In addition, the deformation ratios of the outside peripheral portions of the battery casing due to the thermal fusion are similar or almost the same, whereby the outer circumferential surface of the sealing portion of the outside peripheral portions can present a more smooth appearance.

In one specific example, the electrode assembly may include: a first unit cell having a structure corresponding to an inside shape of the first receiving part; and a second unit cell having a structure corresponding to an inside shape of the second receiving part.

In other words, the electrode assembly may be composed of a combination of the first and second unit cells that are different in size or shape from each other, corresponding to the inside shapes of the first and second receiving parts, respectively.

In this case, the first and second unit cells may not be particularly limited in structure as long as they can be easily formed into structures corresponding to the inside shapes of the first and second receiving parts, respectively.

In one specific example, at least one unit cell of the first and second unit cells may be configured such that a positive electrode plate and a negative electrode plate are stacked with a separator interposed therebetween.

In other words, the first unit cell, or the second unit cell, or both the first and second unit cells may be configured to have a stack type structure in which a positive electrode plate and a negative electrode plate are stacked with a separator interposed therebetween.

In another specific example, at least one of the first and second unit cells may be configured such that a positive electrode sheet and a negative electrode sheet are wound with a separator sheet interposed therebetween in one direction.

In other words, the first unit cell, or the second unit cell, or both the first and second unit cells may have a winding type structure in which a positive electrode sheet, a separator sheet, and a negative electrode sheet, which are formed in a long sheet shape, are simultaneously wound in one direction.

In a further specific example, at least one of the first and second unit cells may be configured such that a plurality of basic units each including a positive electrode plate, a negative electrode plate, and a separator interposed between the positive electrode plate and the negative electrode plate are wound using a separator sheet interposed between each of the basic units.

In other words, the first unit cell, or the second unit cell, or both the first and second unit cells may be configured to have a stack/folding type structure in which the basic units each including a positive electrode plate, a negative electrode plate, and a separator interposed between the positive electrode plate and the negative electrode plate are arranged on a long-sheet shaped separator sheet and then simultaneously wound in one direction, such that the separator sheet is interposed between each of the basic units.

In yet another specific example, the first and second unit cells may be configured such that a plurality of basic units of both the first and second unit cells are simultaneously wound using a single separator sheet interposed between each of the basic units, each of the basic units including a positive electrode plate, a negative electrode plate, and a separator interposed between the positive electrode plate and the negative electrode plate.

In other words, the first and second unit cells may have a structure in which the single separator sheet is interposed between each of the basic units, such that the basic units of the first and second unit cells are simultaneously wound using the separator sheet to be connected to each other.

The remaining configurations of the battery cell except for the above configuration and structure are well known in the art, so a detailed description thereof will be omitted herein.

As described above, in the present invention, the battery casing is divided into the first casing and the second casing provided with the first receiving part and the second receiving part, respectively, the first and second receiving parts having different sizes or shapes. Thus, it is not necessary to form a single receiving part into a complicated structure to correspond to the shape of an electrode assembly having a complicated structure, so that the battery casing can be formed more easily, thereby eliminating or reducing defects that may occur in the forming of the battery casing. In addition, the battery casing is provided with the electrode lead grooves having a downwardly recessed structure, whereby at positions of the electrode leads of the battery casing, the occurrence of portions that remain unfused due to the thickness of the electrode leads can be suppressed and thus the safety of the battery cell can be efficiently enhanced.

BRIEF DESCRIPTION OF THE DRAWINGS

The above and other objects, features and other advantages of the present invention will be more clearly understood from the following detailed description when taken in conjunction with the accompanying drawings, in which:

FIG. 1 is an exploded perspective view schematically showing a structure of a conventional pouch-shaped battery cell;

FIG. 2 is a schematic view showing a structure of a battery casing of a battery cell according to an embodiment of the present invention;

FIG. 3 is an enlarged schematic front view showing electrode lead grooves of the battery casing of FIG. 2; and FIGS. 4 and 5 are schematic views showing a structure of a battery casing of a battery cell according to further embodiments of the present invention.

DETAILED DESCRIPTION OF THE INVENTION

Hereinbelow, exemplary embodiments of the present invention will be described in detail with reference to the accompanying drawings. Various changes to the following embodiments are possible and the scope of the present invention is not limited to the following embodiments.

FIG. 2 is a schematic view showing a structure of a battery casing of a battery cell according to an embodiment of the present invention, and FIG. 3 is an enlarged schematic front view showing electrode lead grooves of the battery casing of FIG. 2.

Referring to FIGS. 2 and 3, a battery casing 200 includes a first casing 210 and a second casing 220. The first and second casings 210 and 220 are integrated into a single unit at a predetermined portion 202 of outside peripheral portions, which is opposite to outside peripheral portions 201 and 201' where electrode tabs protrude, respectively.

The first casing 210 and the second casing 220 includes a first receiving part 211 and a second receiving part 221, respectively, the first and second receiving parts 211 and 221 being recessed downwardly and in which electrode assemblies are accommodated, respectively.

The first and second receiving parts 211 and 221 are formed in a rectangular parallelepiped shape, and configured such that lengths L1 and L2, which are corresponding to directions in which the electrode tabs protrude, are the same, while widths W1 and W2 and depths D1 and D2, which are perpendicular to the directions in which the electrode tabs protrude, are different from each other, respectively. More specifically, the width W1 and the depth D1 of the first receiving part 211 are relatively greater than the width W2 and the depth D2 of the second receiving part 221.

The first and second casings 210 and 220 are folded at the predetermined portion 202 of the outside peripheral portions where the first and second casings 210 and 220 are integrated with each other, and then the remaining outside peripheral portions are thermal fused together, whereby the first and second casings 210 and 220 are sealed. Thus, the electrode assemblies are accommodated in the receiving parts 211 and 221, respectively.

A distance L3 between the first and second receiving parts 211 and 221 at the predetermined portion 202 of the outside peripheral portions where the first and second casings 210 and 220 are integrated with each other may be formed in a range of 1.0 to 2.0 millimeters, such that in the process of forming the receiving parts 211 and 221 by deep drawing, damages to the predetermined portion 202 where the first and second casings 210 and 220 are integrated with each other can be prevented while formation of unnecessary sealing portions can be minimized. More specifically, the distance L3 may be in a range of 1.1 to 1.7 millimeters. The first and second casings 210 and 220 are provided with electrode lead grooves 212 and 222, respectively, the electrode lead grooves 212 and 222 being formed on the outside peripheral portions 201 and 201' where electrode leads 310 connected to the electrode taps protrude, respectively. The electrode lead grooves 212 and 222 are recessed downwardly such that the electrode leads 310 are seated therein, and the electrode lead grooves 212 and 222 are configured to communicate with the first receiving part 211 of the first casing 210 and the second receiving part 221 of the second casing 220.

The depths of the electrode lead grooves 212 and 222 are equal to each other, and a total depth D3 obtained by adding the depths of the electrode lead grooves 212 and 222 is about 50% with respect to a thickness T1 of the electrode leads 310.

Thus, when the outside peripheral portions 201 and 202' of the battery casing 200 where the electrode leads 310 protrude are thermally fused together, the portions that remain unfused due to the thickness T1 of the electrode leads 310 can be suppressed from being generated. In addition, the electrode lead grooves 212 and 222 can exhibit proper elongation whereby the finished appearance of the battery casing 200 is allowed to present an aesthetic and smooth appearance.

FIGS. 4 and 5 are schematic views showing a structure of a battery casing of a battery cell according to further embodiments of the present invention.

First, referring to FIG. 4, a battery casing 400 includes a first casing 410 and a second casing 420. The first casing 410 and the second casing 420 are configured as separate members structured such that second outside peripheral portions 402 and 402' opposite to first outside peripheral portions 401 and 401' where electrode tabs protrude, respectively, are separated from each other.

The remaining configurations except for the above configuration are the same as those of the battery casing of FIG. 2, so a detailed description thereof will be omitted.

Referring to FIG. 5, a battery casing 500 includes a first casing 510 and a second casing 520. The first casing 510 includes an inner peripheral surface 513 inclindely formed at a position adjacent to a predetermined portion 502 of outside peripheral portions where first and second casings 510 and 520 are integrated with each other.

The remaining configurations except for the above configuration are the same as those of the battery casing of FIG. 2, so a detailed description thereof will be omitted. Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A battery cell, comprising:
   an electrode assembly including a positive electrode, a negative electrode, and a separator interposed between the positive electrode and the negative electrode, with electrode tabs protruding from at least one side of outside peripheral portions of the electrode assembly, each electrode tab being made of metal; and
   a battery casing made of elongatable material including a first casing and a second casing provided with a first receiving part and a second receiving part, respectively, the first and second receiving parts respectively accommodating the electrode assembly and having different sizes or shapes, each of the first casing and the second casing being a laminate sheet including a metal layer and a resin layer,
   wherein electrode lead grooves are formed at a portion of outside peripheral portions of each of the first and second casings, respectively, which correspond to one another, where electrode leads protrude, the electrode lead grooves being recessed downwardly such that the electrode leads are seated therein, and, prior to sealing the battery casing by thermal fusing, a total depth obtained by adding a depth of the electrode lead grooves formed at the first casing and a depth of the electrode lead grooves formed at the second casing is smaller than a thickness of the electrode
   wherein a width of each lead groove at a top surface of the peripheral portion to a bottommost surface of the groove is constant,
   wherein in a state in which the first casing is arranged to overlap the second casing and the electrode leads seated in the electrode lead grooves are connected to the electrode tabs protrude from the outside peripheral portions of the first and second casings, the battery casing is sealed by thermal fusion along the outside peripheral portions of the first and second casings,
   wherein the electrode lead grooves are elongated by thermal fusion, and
   wherein the electrode leads have a constant thickness and the metal of the electrode leads directly contact the resin layer of the first casing and the resin layer of the second casing.

2. The battery cell of claim 1, wherein the battery casing is configured such that the first and second casings are integrated into a single unit at a predetermined portion of the outside peripheral portions, the first and second casings being configured such that in a state in which the first and second casings are folded at the predetermined portion, remaining portions of the outside peripheral portions are sealed by thermal fusion to each other, such that the first and second receiving parts accommodate the electrode assembly, respectively.

3. The battery cell of claim 2, wherein at the predetermined portion where the first and second casings are integrated into the single unit, a distance between the first and second receiving parts is in a range of 1.0 to 2.0 millimeters.

4. The battery cell of claim 1, wherein the first and second casings are configured as separated members, and all the outside peripheral portions are sealed by thermal fusion.

5. The battery cell of claim 1, wherein the first receiving part, or the second receiving part, or both the first receiving part and the second receiving part include at least one inner peripheral surface having a tapered structure in which width becomes gradually narrower outwards in a vertical cross section.

6. The battery cell of claim 1, wherein the total depth obtained by adding the depth of the electrode lead grooves formed at the first casing and the depth of the electrode lead grooves formed at the second casing is 50 to 99% with respect to the thickness of the electrode leads.

7. The battery cell of claim 1, wherein the depth of the electrode lead grooves formed at the first casing and the depth of the electrode lead grooves formed at the second casing are equal to each other.

8. The battery cell of claim 1, wherein the electrode assembly includes:
   a first unit cell having a structure corresponding to an inside shape of the first receiving part; and
   a second unit cell having a structure corresponding to an inside shape of the second receiving part.

9. The battery cell of claim 8, wherein at least one of the first and second unit cells is configured such that a positive electrode plate and a negative electrode plate are stacked with a separator interposed therebetween.

10. The battery cell of claim 8, wherein at least one of the first and second unit cells is configured such that a positive electrode sheet and a negative electrode sheet are wound with a separator sheet interposed therebetween in one direction.

11. The battery cell of claim 8, wherein at least one of the first and second unit cells is configured such that a plurality of basic units each including a positive electrode plate, a negative electrode plate, and a separator interposed between the positive electrode plate and the negative electrode plate are wound using a separator sheet interposed between each of the basic units.

12. The battery cell of claim 8, wherein the first and second unit cells are configured such that a plurality of basic units of both the first and second unit cells are simultaneously wound using a single separator sheet interposed between each of the basic units, each of the basic units including a positive electrode plate, a negative electrode plate, and a separator interposed between the positive electrode plate and the negative electrode plate.

13. A battery cell, comprising:
   an electrode assembly including a positive electrode, a negative electrode, and a separator interposed between the positive electrode and the negative electrode, with electrode tabs protruding from at least one side of outside peripheral portions of the electrode assembly, each electrode tab being made of metal; and a battery casing made of elongatable material including a first casing and a second casing provided with a first receiving part and a second receiving part, respectively, the first and second receiving parts respectively accommodating the electrode assembly and having different sizes or shapes, each of the first casing and the second casing being a laminate sheet including a metal layer and a resin layer, wherein electrode lead grooves are formed at a portion of outside peripheral portions of each of the first and second casings, respectively, which correspond to one another, where electrode leads protrude, the electrode lead grooves being recessed downwardly such that the electrode leads are seated therein, and, prior to sealing the battery casing by thermal fusing, a total depth obtained by adding a depth of the electrode lead grooves formed at the first casing and a depth of the electrode lead grooves formed at the second casing is smaller than a thickness of the electrode leads, wherein a sidewall of each electrode lead groove connecting a top surface of the peripheral portion to a bottommost surface is straight, wherein in a state in which the first casing is arranged to overlap the second casing and the electrode leads seated in the electrode lead grooves are connected to the electrode tabs protrude from the outside peripheral portions of the first and second casings, the battery casing is sealed by thermal fusion along the outside peripheral portions of the first and second casings, wherein the electrode lead grooves are elongated by thermal fusion, and wherein the electrode leads have a constant thickness and the metal of the electrode leads directly contact the resin layer of the first casing and the resin layer of the second casing.

* * * * *